Nov. 7, 1939.                D. E. REED                2,179,022
                      AUTOMOBILE SIGNAL DEVICE
                       Filed Dec. 19, 1935          2 Sheets-Sheet 1
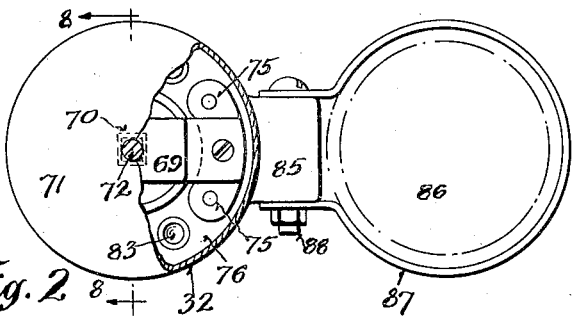
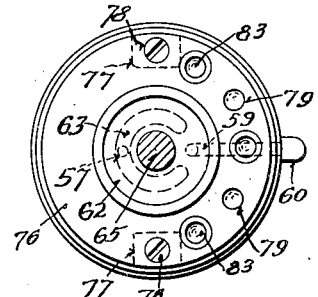
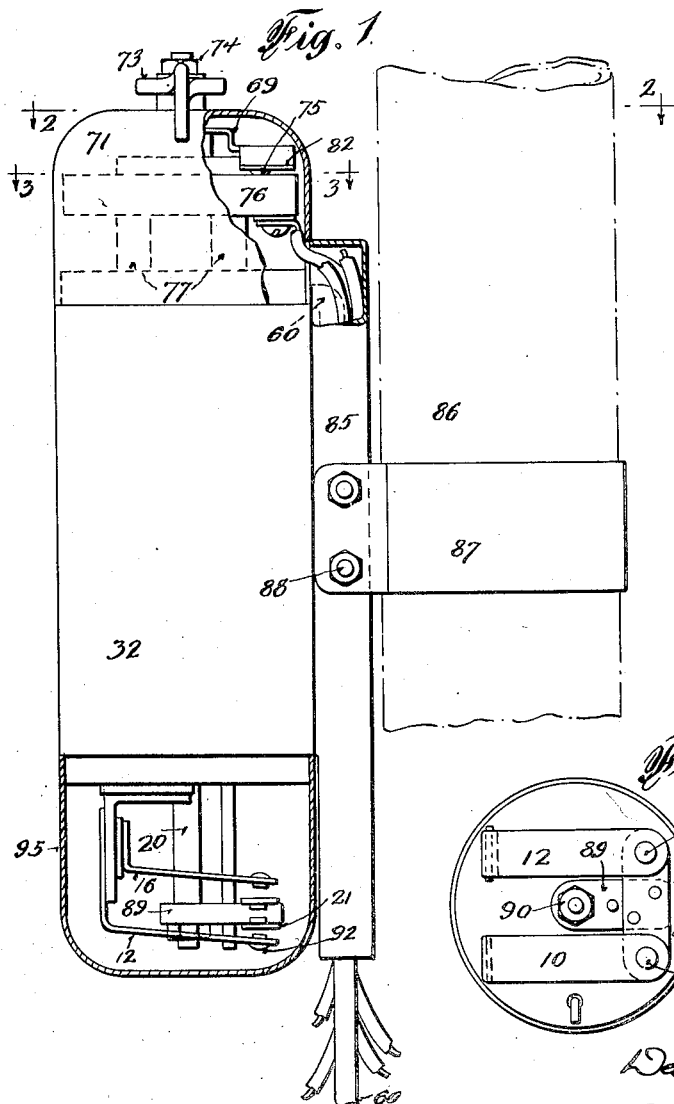
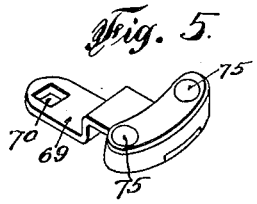
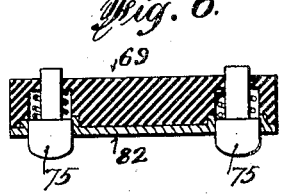
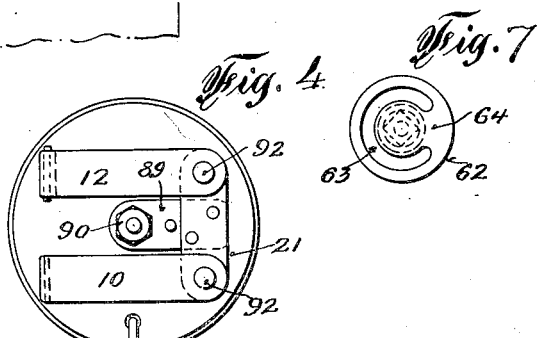
INVENTOR
Daniel E. Reed
BY
Charles G. Hensley
ATTORNEY

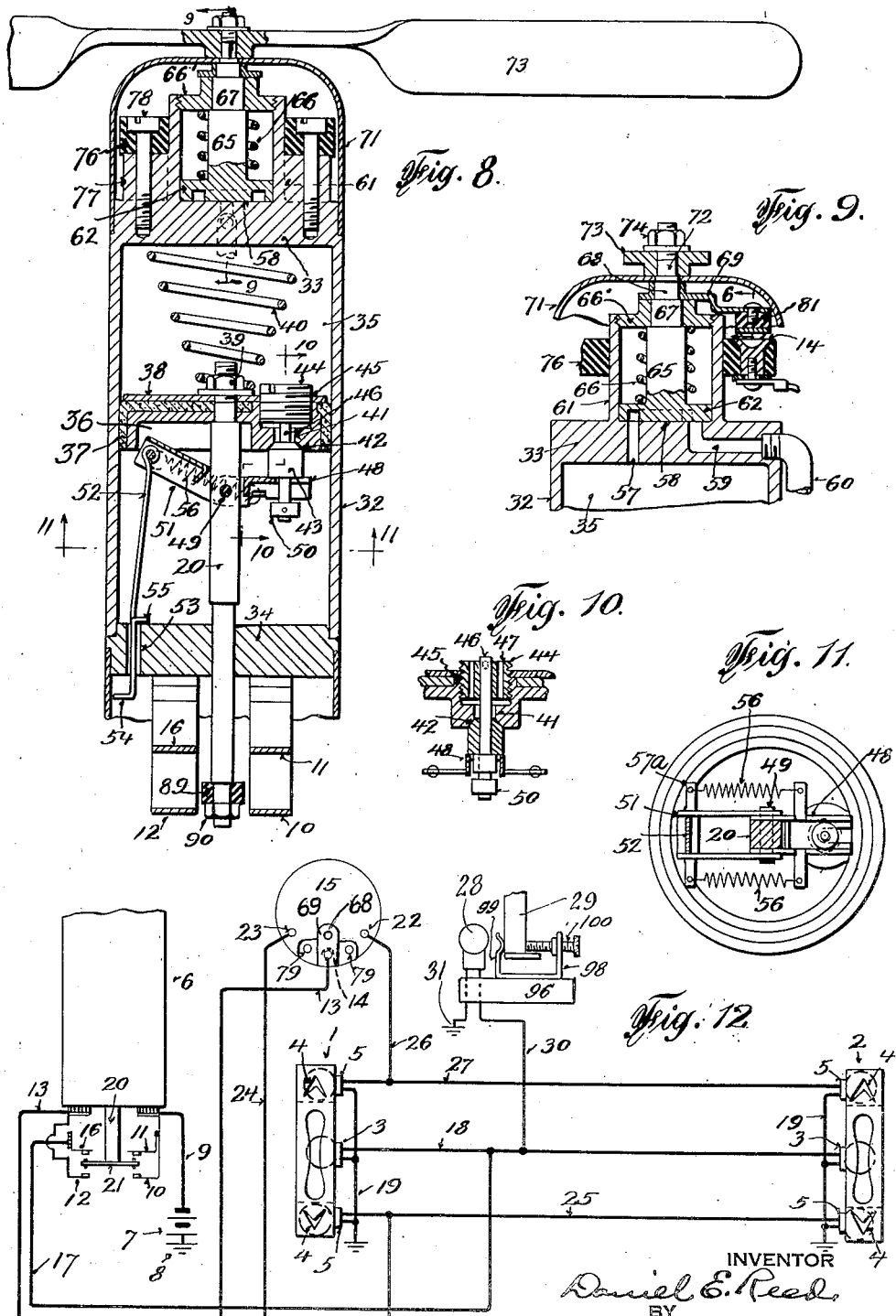

Patented Nov. 7, 1939

2,179,022

UNITED STATES PATENT OFFICE 2,179,022

AUTOMOBILE SIGNAL DEVICE

Daniel E. Reed, Brooklyn, N. Y., assignor to Reed Safety Signal System, Inc., New York, N. Y., a corporation of New York Application December 19, 1935, Serial No. 55,139

4 Claims. (Cl. 177—337)

My invention relates to signal devices for use on automobiles and it serves to signal to persons in vehicles behind or in front of the one on which the device is used, of the intention of the driver to make a right or left turn, whereby the drivers of approaching vehicles will be warned of the intention to turn.

One object of my invention is to provide a light signal, the visible portion of which is preferably made to represent an arrow with one portion representing the shaft of the arrow and with lights at either end of the shaft portion with suitable cut-outs in the lamp casing to indicate the points of the arrow, one directed to the right and one directed to the left. When the signal is operated the shaft portion is operated and one of the points to indicate the direction the driver intends to turn.

The device so operates that the lights of the signal are flashed and in the preferred embodiment the light or lights forming the shaft portion of the arrow is or are lighted and extinguished in alternate relation with the light which flashes at the point of the arrow. This not only attracts the attention of all drivers to the rear of the vehicle but the alternate action of the lights has the effect of making the arrow more striking in effect than if steadily illuminated.

When the controlling lever is operated for a right or left turn the lamp or lamps which form the shaft of the arrow are made operative and one of the lamps indicating the point of the arrow is made operative according to which way the controlling lever is operated.

Preferably, the arrow signalling device is duplicated at both the front of the automobile and at the rear, so that drivers of vehicles in front as well as the rear of the automobile on which the device is used will be acquainted with the intention of the driver to make a right or left turn. The present device is controlled by a lever located near the steering wheel and the driver may indicate through the operation of this lever the intention to make a right or left turn as the case may be, while waiting at a corner stop or when about to approach a corner where a turn is to be made.

The rapid flashing of the signal lights will attract immediate attention so that the drivers of adjacent vehicles will be positively warned of an approaching turn by the vehicle on which the device is used.

Another object of my invention is to provide a suction operated motor, preferably operated by the vacuum in the intake manifold of the engine, which suction motor automatically causes the flashing of the lights of the signals and in such time intervals as to cause the flashing of the lights rather than a steady light. The suction which operates the suction motor is controlled by the same lever which determines which lights will be in circuit to indicate a right or left turn, so that the motor is automatically thrown into operation whenever the lever is moved to indicate a right or left turn and the motor continues to operate and flash the lamps until the lever is moved back to neutral or off position. The motor is turned on regardless of whether the control lever is moved for a right or left turn.

The suction motor per se forms the subject matter of Letters Patent No. 2,047,382, issued to me July 14, 1936, so that the motor per se is not covered in this application.

One object of my invention is to use a suction motor for flashing the lights and to employ a common operating means, such as a lever, for throwing the motor into and out of operation, as well as for connecting the lamps to designate a left or right turn. The present device is simple, compact and inexpensive, and it is durable.

Another object of the invention is to provide a simple dependable and durable tell tale device for indicating to the driver of the automobile on which my signal apparatus is used, whenever one or more of the signal lights burns out or otherwise becomes inoperative. By this means the driver will not only be informed whether the signal is operating but also whether it is operating at full efficiency, i. e., that all the lamps of the signal system are operating. The present tell tale device is adapted to operate successfully in connection with flashing lamps whereas heretofore such protective devices have only been operated in connection with steady burning lamps. The tell tale device shown herein is so made that the only current passing through the tell tale or indicating lamp is that required for its own operation, this current passing only through a relay circuit. This circuit is independent of the circuit which passes through the relay of the tell tale device.

Instead of having to wind the magnet of the tell tale device with great accuracy to match the resistance of the several lamps of the signal system I provide mechanical means for adjusting the tension on the armature of the relay magnet, so that this adjustment permits of an accurate balancing of the magnet to accord with the lamps in operation and the device may be tested to insure actual operation.

Other features and advantages will be set forth in the following detailed description of my invention.

In the drawings forming part of this application,

Figure 1 is an elevation of the suction motor attached to the steering post of an automobile, with parts of the casing of the motor broken away to show the interior parts, Figure 2 is a sectional view taken on the line 2—2 of Figure 1, Figure 3 is a sectional view taken on the line 3—3 of Figure 1, Figure 4 is an inverted plan view of the lower end of the motor with the cap or cover removed, Figure 5 is a perspective view of the switch for controlling right and left lights, Figure 6 is a sectional view taken on the line 6—6 of Figure 9, Figure 7 is an inverted plan view of the valve which controls the operation of the motor, Figure 8 is a sectional view taken on the line 8—8 of Figure 2, Figure 9 is a sectional view taken on the line 9—9 of Figure 8, Figure 10 is a sectional view taken on the line 10—10 of Figure 8, Figure 11 is a sectional view taken on the line 11—11 of Figure 8, and Figure 12 is a diagrammatic view of the electric circuit.

In Figure 12 I have shown two lamp housings 1 and 2, one of which may be appropriately placed at the front of the automobile and the other at the rear of the automobile facing backwardly, although if desired only the rear signal may be used. Within each lamp housing there is or are one or more lamps 3 showing through the cover of the lamp housing, to indicate the shaft of an arrow. At each end of the lamp housing there is an opening 4 shaped to represent the point of an arrow, the two openings being arranged beyond opposite ends of the shaft of the arrow and pointing in opposite directions in relation to the shaft. There is a lamp 5 opposite each of these arrow point openings to shine through the same. Both lamp housings are preferably made alike so that this description applies to both.

At 6 I have designated diagrammatically the suction motor which will be hereinafter described in detail. At 7 I have shown a source of current which may be the storage battery usually present on the automobile; one side of the battery is grounded as shown at 8. Connected to the other side of the battery there is a wire 9 which leads to two contact arms 10, 11, preferably spring arms attached to one end of the motor, so that current from one side of the battery is applied to both of these contact arms.

There is another contact arm 12 arranged opposite the contact arm 10 and the wire 13 leading from this contact arm connects with the contact point 14 on the switch 15. The spring arm 16 is opposite the arm 11 and the wire 17 connected with the spring arm 16 is connected with the lamps 3 which shine through the shaft of the arrow. The other side of each of these lamps is connected by a wire 19 to ground, thus completing the circuit including the source of current and the lamps which light the shafts of the arrows in both lamp housings, where both front and rear signals are used. If only a rear signal is used, the circuit will be connected only with the lamp of one housing.

The spindle 20 of the motor carries a conducting strap 21 for connecting the several spring contact arms and it has contact members adapted, when the spindle is in its upper position, to contact with the contact members on the contact arms 11, 16 to complete the circuit which includes the lamps which shine through the shaft of the arrow. When the spindle of the motor is in its lower position the strap 21 will connect with the spring arms 10, 12. It will be disconnected from the spring arms 11, 16 in the lower position and therefore the circuit thus described will be broken at this point and the shaft lamps will be temporarily extinguished.

When the motor is in operation the spindle reciprocates and thus by making a break in the circuit just described causes the lamps 3 to flash. When the controlling switch is thrown right or left it will connect either with the contact 22 or with the contact 23, according to which direction the control lever is operated; and also with the contact 14.

If the switch is moved so that it makes contact with the contact members 14, 23 then the current will pass from the wire 13 to the wire 24 and this wire is connected with the wire 25 which leads to the lamps in the lamp housings which are arranged to reflect through the arrow point which points to the left.

If on the other hand the switch is moved so that it makes contact with the point 14 and the point 22, then the current will pass from the wire 13 through the switch arm to the wire 26 and from there the current will pass through the wire 27 to the lamps 5 in the lamp housings which are in line with the arrow point indicating a right turn. The opposite sides of the lamps 3 and 5 are grounded so that the circuit is completed in either of the above instances back to the battery.

It will be apparent from what has just been described that the lamp or lamps reflecting through the shaft of the arrow is not connected with the switch 15 and these lights are simply flashed whenever the suction motor is operated because the shaft of the arrow is flashed regardless of whether a right or left turn is to be made. The switch 15 however, will connect the wire 13 with either the wire 24 of the wire 26 so that only the lamp behind one point of the arrow is lighted at a time although these lights are flashed in accordance with the movement of the suction motor. The lamps 3 which light the shaft of the arrow are flashed alternately in relation to those that light the arrow points.

It will be noticed that when the strap 21 is in its lower position the two wires 9, 13 are connected through this strap, thus feeding current to the switch and to the right or left arrow point lamps. When the spindle 20 moves upwardly it breaks the circuit between the wires 9 and 13, thus extinguishing momentarily the lamps which reflect through the points of the arrow. When the spindle 20 goes upwardly the strap 21 contacts with the spring arms 11, 16 and thus establishes a connection between the wire 9 and the wire 17. This latter wire which is connected with the wire 18 supplies current to the lamp or lamps reflecting through the shaft of the arrow.

Thus the shaft of the arrow is lighted at the time when the lamps behind the points of the arrow are extinguished. When the spindle 20 comes down again it breaks the circuit between the wires 9 and 13 thus extinguishing the lamps which reflect through the shaft of the arrow and the strap again connects the spring arms 10, 12 which sends current to the switch 15 and therefore to the lamps at the points of the arrows.

From what has been said it will be apparent that the lamps at the shafts of the arrows are flashed in alternate relation to the lamps behind the points of the arrows and this not only attracts attention to the signal device but it also gives the effect of the arrow travelling or pointing either to the right or left, according to the setting of the hand switch.

I have shown a small pilot lamp 28 which may be placed on the dash 29 of the automobile to indicate to the driver that the flashing signals are operating. A wire 30 connected with one side of this lamp is connected also with the wire 18 so that the current fed to this wire to operate the lamps in the shafts of the arrows will light the pilot lamp 28 if the circuit is properly operating; and if the pilot light fails to flash it will indicate that the signal is not properly operating. The wire 31 connected to the opposite side of the pilot lamp is grounded, thereby completing the circuit back to the battery.

I will here describe the suction motor for automatically flashing the signal lamp. The motor is shown as including a cylindrical shell 32 preferably having an integral head 33 at one end and a removable head 34 at the opposite end, forming a chamber 35 in which the piston 36 is adapted to reciprocate. This piston may consist of the head with a leather or other washer 37 engaging the surface of the cylinder and with a metal washer 38 clamped against the soft washer by means of a nut 39 threaded onto the end of the spindle 20.

Between the piston and the head of the cylinder there is a helical spring 40 which serves to move the piston downwardly in Figure 8. A part of the piston is formed with a port 41 at one end of which is formed the valve seat 42 against which the valve 43 is adapted to seat to shut off air communication between opposite sides of the piston and when unseated to permit air to pass from one side to the other of the piston.

I have shown a block 44 threaded into the recess 45 in the piston, which block has a central aperture to form a guide for the spindle 46 of the valve 43 and it is also provided with apertures 47 extending through the block to permit air which passes through the space 41 to pass through the block and complete the air communication between opposite sides of the piston.

There is a lever 48 pivoted on the pin 49 in the spindle of the piston, this lever having bifurcated arms which straddle the spindle 46 of the valve 43 and which are adapted to press on the bottom of the valve to hold it seated on the valve seat 42 or to press downwardly on the collar 50 on the spindle 46 for the purpose of unseating the valve. On the same pin 49 there is pivoted a double arm lever 51 to the outer end of which is pivotally connected a link 52 which extends downwardly and one end of which passes through the enlarged opening 53 in the head 34 of the cylinder.

This portion of the link is provided with the bent end 54 below the head adapted to engage the under side of the head when the link moves upwardly; and with a turned over lip 55 adapted to engage the top surface of the head 34 when the link moves downwardly. There is a spring 56 connected with the pin 57a adjacent the outer end of the lever 51 and this spring passes across the axial line of the pivot pin 49 and its opposite end is connected with the lever 48.

I have shown a pair of such springs arranged on opposite sides of the pivot of the lever. When the piston moves upwardly in Figure 8 at which time the valve 43 is seated against the valve seat 42, the lever 51 and the link 52 move with the spindle 20 until the bent end 54 of the link strikes the bottom surface of the head 34 and continued upward movement of the piston causes the lever 51 to be rocked upon the pin 49 but at first the lever 48 does not move. However, when the spring 56 through the movement of the lever 51 crosses the axis of the pivot 49 the spring suddenly swings the lever 51 downwardly and also the lever 48 and the latter quickly unseats the valve 43 and allows air to pass from one side to the other of the piston for a purpose which will be set forth.

This causes the suction above the piston to be broken and the piston then moves downwardly under the action of the spring 40 and near the bottom stroke of the piston the member 55 of the link 52 strikes the top of the head 34 and further downward movement of the piston causes the lever 51 to be rocked clockwise on the pivot 49 and when the spring 56 crosses back over the center, i. e., across the line of the pin 49, the lever 48 is moved quickly up to press the valve 43 against the seat 42 and thus cut off air communication between opposite sides of the piston. The suction will then cause the piston to move upwardly again.

The head of the cylinder is shown as provided with a port 57 opening at the face of the valve seat 58 and with its opposite end in communication with the interior of the cylinder above the piston. There is another port 59 which is angular and one end opens at the face of the valve seat 58 while the other end opens at the side of the cylinder where it is connected with one end of the hose 60.

This hose extends to and is connected with the intake manifold of the automobile, whereby the partial vacuum therein causes a suction in the port 59.

The head 33 of the cylinder is shown as provided with an upwardly extending cylindrical portion 61 which forms a housing for an oscillating valve 62 which seats against the valve seat 58. The bottom face of this valve is provided with an arcuate port 63 as shown in Figure 7 which is adapted to establish communication between the ports 57, 59 in the cylinder head and the solid portion 64 intermediate the ends of this arcuate port is adapted to shut off communication between the ports 57, 59. It will be apparent that when the solid portion 64 is covering the port 59 that oscillation of the valve body 62 either to the right or left will establish communication between the ports 57, 59.

The valve body 62 has a stem 65 around which is disposed a coiled spring 66 which presses downwardly upon the valve body to keep it seated against the seat 58. The upper end of this spring presses against the under side of the nut 66' which is threaded into the upper end of the cylindrical portion 61. At 67 the valve spindle is reduced in diameter and has its bearings in a boss in the nut 66'. At 68 the valve spindle is made polygonal or square to receive thereover the switch arm 69 which has a square aperture 70 corresponding with the square portion of the spindle whereby the switch arm will turn with the spindle. There is a removable cap or cover 71 for the upper end of the cylinder and this has an aperture through which the upper, reduced end 72 of the spindle passes.

Above the cover the spindle is shown as again reduced in diameter to receive thereover the hub of the operating lever 73 and this hub is held on the end of the spindle by means of the nut 74 threaded on the upper end of the spindle.

The lever 73 has arms extending in opposite directions and the outer end of these arms are adapted to be grasped by the hand of the driver to turn the switch and the valve.

Through the tube 60 connected with the intake manifold of the automobile suction is created in the port 59 at the head of the suction motor. When the hand lever 73 is turned right or left the arcuate port 63 is brought into register with the port 59 and at the same time this arcuate port registers with the port 57 thereby establishing communication between the two ports, and this causes the suction to create a partial vacuum in the cylinder above the piston. When this occurs the piston is drawn upwardly against the resistance of the spring 40 until the valve 43 is unseated in the manner described, whereupon air is permitted to pass from below the piston to above the piston, thus destroying the effect of the vacuum, whereupon the piston is moved downwardly by the spring 40 and the operations are repeated as long as the ports 57, 59 are in communication.

The switch arm 69 which is moved from the neutral position to a right or left position by the operation of the controlling lever 73 is provided with spring plungers 75 which press downwardly on the upper face of an annular block 76 of insulating material which is mounted on extensions 77 of the head 33 of the cylinder by means of screws 78. This insulating ring has impressions 79 in which the spring plungers 75 press to resistibly hold the switch arm from turning accidentally.

The plungers 75 are connected by the strap 82 conductively.

The contact members 75 are shown as having rounded ends which engage in similar recesses 83 in the upper ends of the contact members 14, 22, 23 which are seated in suitable apertures in the insulating ring 76. There are three such contact members 14, 22, 23 and they are connected respectively with the wires 13, 26, 24 in the order shown in Figure 12. When the switch arm 69 is positioned where the plungers 75 engage in the recesses 79 the contacts of the switch arm are out of contact with all of the contact members 14, 22, 23 so that there is no circuit through the switch 15.

If the switch arm is turned clockwise in Figure 2 against the resistance of the plunger pins 75 then one of the contact members 75 will snap into the recess of the contact member 14 and the other will snap into the recess of the contact member 22 and this will establish electrical connection between the wires 13, 24 in Figure 12, thus causing the lamps at the right arrow points to be lighted. If, on the contrary, the switch is turned counterclockwise in Figure 2, then the contact members 75 on the switch will snap into the recesses of the contact members 14 and 23, and this will establish connection through the strap 82 between the wires 13 and 23 and this will close the circuit which includes the lamps behind the left hand arrow points and thus signal an intention of making a left turn.

Preferably, the several wires connected with the switch 15 and the tube 60 are grouped together in a common cable, as shown in Figure 1, which cable extends through the side extension 85 formed on the outer side of the cylinder 32. Preferably, the motor is attached to the steering post 86 of the automobile by a strap 87 encircling the post and bolted to the side extension 85 of the motor cylinder by bolts 88.

On the lower end of the spindle 20 of the motor piston I have secured a bar 89 of insulating material which is secured against the shoulder of the spindle by the nut 90. On the free end of the insulating bar 89 there is a conductive strap 21 which carries a pair of contact members which face and are adapted to contact with contact members on the spring arms 10, 12 previously referred to. The strap 21 also has contact members facing in the opposite direction, which are adapted to make contact with the contact members on the spring arms 11, 16. The action of the strap 21 in relation to the circuits has been previously described above. I have shown a cap 95 fitted over the lower end of the motor to enclose and protect the several spring arms.

Operation

As long as the automobile is to be driven straight ahead, the operating lever 73 is left in neutral position so that there is no circuit through the switch 15 and the ports 57, 59 of the suction motor are shut off by the solid portion 64 of the oscillating valve, so that the motor remains idle and with the piston in its lower position to which it is always driven when the suction is inactive on the motor because of the spring 40. If the driver of the automobile is about to make a right turn the lever 73 will be turned clockwise until the contact members 75 spring into the sockets of the contact members 14, 23.

This action swings the switch arm 69 clockwise in Figure 2 and connects the contact members 14 and 23 through the strap 82, thereby establishing a circuit through the lamp at the point of the arrow which points to the right. This operation also oscillates the valve 62 so that the port 63 establishes communication between the ports 57, 59 and immediately the suction action acts on the motor piston to move it upwardly against the opposition of the spring 40.

During the upward movement of the piston the contacts on the strap 21 move away from the contacts on the arms 10, 12, thus breaking the circuit which includes the lamps lighting the right points of the arrows, after which the contacts on the strap 21 make contact with the contacts on the arms 11, 16 thereupon closing the circuit which includes the lamps in the shafts of the arrows. When the piston of the motor completes its upward movement and the valve 43 is unseated, air rushes through the piston and destroys the effect of the vacuum above the piston. The piston then moves downwardly under the action of the spring 40.

This downward movement of the piston breaks the connection between the strap 91 and the spring arms 11, 16, thus extinguishing the lamps behind the shaft of the arrows and the strap 91 then establishes connection between the spring arms 10, 12 and this closes the circuit which includes the lamps behind the right point of the arrow.

As the motor continues to operate, the signal lights are flashed in alternate relation as just described. Whenever the control lever 73 is moved back to neutral position the circuits including the lamps behind the points in the arrows will be broken at the switch 15. Furthermore, the solid portion 64 of the valve 62 will close the port 59 and thus cut off the suction of the motor and the latter will stop in its lowermost position, in which position all the lights of the signal will be extinguished.

If it is intended to make a left turn, the controlling lever 73 will be moved counterclockwise, in which case the above operations will be repeated, with the exception that the switch shown in Figure 5 will establish connection between the contacts 14 and 22 and this will connect the lamps at the left points of the arrows in circuit with the battery, subject to the flashing action of the suction motor.

From the above it will be apparent that I have provided a simple and effective device which will not only indicate the intention to make a right or left turn but which will flash the lamps to attract the attention of operators of other vehicles. By flashing the lights through the shaft of the arrows alternately in relation to those at the points of the arrows, the arrows have the effect of moving in the direction at which they are pointed, which also immediately indicates to the drivers of other vehicles which way the operator of the vehicle on which the invention is employed is about to turn. The parts of the device are small and compact. The device may be made at a low cost so that it may be applied as standard equipment on automobiles as they are manufactured, or it may be attached to automobiles now in use, in a very simple manner.

Having described my invention, what I claim is:

1. A signal device for automobiles, including a housing adapted to be mounted on an automobile, and having means for indicating the shaft of an arrow and means for indicating arrow points oppositely disposed at opposite ends of said shaft portion of the arrow, lamps for said shaft portion of the arrow and for each point portion thereof connected in independent open circuits with a source of electric current, a manually adjustable switch adapted to close the circuit of the lamp for the shaft portion and the circuit of the lamp for either one of the point portions of the arrow, and means for alternately closing the circuit of said lamps and alternately illuminate the shaft portion and said point portion of the arrow.

2. A signal device for automobiles, including a lamp housing adapted to be mounted on an automobile and having the representation of a shaft of an arrow, and having a representation of points of an arrow disposed in opposite positions at opposite ends of the shaft portion of said arrow, a lamp for illuminating the shaft portion of said arrow, a lamp for illuminating each of the point portions of said arrow, and each of said lamps connected in an open electric circuit, a manually adjustable switch to close the circuit of the lamp for either point portion of the arrow and the lamp for the shaft portion of the arrow, circuit closing means to independently close the circuit of the lamp for the shaft portion and the circuit of the lamp for the point portion of the arrow closed by the switch, and means to actuate said circuit closing means to alternately close and open the circuit of the lamps and alternately illuminate the shaft portion and said point portion of the arrow.

3. A signal device for automobiles including a lamp housing adapted to be mounted on an automobile and having the representation of a shaft of an arrow and having the representation of points of an arrow disposed in opposite positions at opposite ends of the shaft portion of the arrow, a source of power, lamps each connected in an independent open circuit with the source of power to illuminate the shaft and point portions of the arrow, an adjustable switch to close the circuit of the lamp for the shaft portion of the arrow and the circuit of the lamp for either one of the point portions of the arrow, circuit making and breaking means to close and open the circuits of the lamp to illuminate the shaft portion of the arrow and of the lamp for the point portion of the arrow closed by the switch, and means for actuating said circuit making and breaking means to alternately open and close the circuits of the lamps connected in circuit with the source of power through the switch to alternately flash and illuminate the shaft portion and a point portion of the arrow.

4. A signal device for automobiles, including a housing adapted to be mounted on an automobile, and having means for indicating the shaft of an arrow and means for indicating arrow points oppositely disposed at opposite ends of said shaft portion of the arrow, lamps for said shaft portion of the arrow and for said point portions thereof connected in independent electric circuits, a manually operated switch for connecting either one of the lamps at said point portions of the arrow and the lamp of the shaft portion of the arrow in independent electric circuits with a source of electric energy, a motor, and circuit making and breaking means connected in circuit with the lamps operated by the motor for intermittently closing the circuits of the lamp for the shaft portion of the arrow and the lamp for the point portion of the arrow connected in the circuit by the switch and closing and opening the circuit of one lamp alternately with the other.

DANIEL E. REED.